(12) United States Patent
Ostergaard et al.

(10) Patent No.: US 10,703,399 B2
(45) Date of Patent: Jul. 7, 2020

(54) FOLDING TRAILER FOR A WAGON

(71) Applicant: RADIO FLYER INC., Chicago, IL (US)

(72) Inventors: Collin Ostergaard, Chicago, IL (US); Daniel Gulick, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 16/139,749

(22) Filed: Sep. 24, 2018

(65) Prior Publication Data

US 2019/0092363 A1 Mar. 28, 2019

Related U.S. Application Data

(60) Provisional application No. 62/563,357, filed on Sep. 26, 2017.

(51) Int. Cl.
*B62B 3/00* (2006.01)
*B62B 3/02* (2006.01)

(52) U.S. Cl.
CPC .............. *B62B 3/007* (2013.01); *B62B 3/002* (2013.01); *B62B 3/022* (2013.01); *B62B 2205/26* (2013.01); *B62B 2301/04* (2013.01)

(58) Field of Classification Search
CPC .. B62B 3/02; B62B 3/001; B62B 9/28; B62B 5/002
See application file for complete search history.

(56) References Cited

U.S. PATENT DOCUMENTS

| 3,189,365 | A | * | 6/1965 | Blacher | B60D 1/66 280/414.1 |
| 3,515,234 | A | * | 6/1970 | Danford | A01D 45/16 180/217 |
| 5,927,730 | A | * | 7/1999 | Sattler | B62B 5/002 280/47.131 |
| 7,731,221 | B2 | * | 6/2010 | Bess | B62B 3/02 280/30 |
| 7,971,884 | B2 | * | 7/2011 | Lundh | B62B 9/28 280/32.7 |
| 8,029,007 | B2 | * | 10/2011 | Jones | B62D 63/00 280/204 |
| 8,454,046 | B1 | * | 6/2013 | Hobbs, Jr. | B60D 1/155 280/488 |
| 9,321,475 | B2 | * | 4/2016 | Weber | B62B 9/28 |
| 2005/0104323 | A1 | * | 5/2005 | Thurm | B60P 3/07 280/491.1 |
| 2009/0309330 | A1 | * | 12/2009 | Ryan | B60D 1/46 280/462 |
| 2010/0176574 | A1 | * | 7/2010 | Pollice | B62B 3/02 280/401 |
| 2013/0300072 | A1 | * | 11/2013 | Piaget | B62B 5/0079 280/1.5 |
| 2016/0052355 | A1 | * | 2/2016 | Brown | B62B 3/001 280/511 |

* cited by examiner

*Primary Examiner* — Hau V Phan
(74) *Attorney, Agent, or Firm* — Barnes & Thornburg LLP (57) ABSTRACT

A trailer assembly is provided for a wagon. The trailer assembly has a trailer frame comprising a first frame pivotally connected to the wagon, a second frame pivotally connected to the wagon, and a first link pivotally connecting the first frame to the second frame. The trailer frame is positionable between a first or use position and a second or folded position, A wheel is rotatedly connected to the trailer frame to support the trailer frame in the use position.

21 Claims, 10 Drawing Sheets

FOLDING TRAILER FOR A WAGON

CROSS-REFERENCE TO RELATED APPLICATIONS

This application claims the benefit of U.S. Provisional Patent Application No. 62/563,357, filed Sep. 26, 2017, which is expressly incorporated by reference and made a part hereof.

FEDERALLY SPONSORED RESEARCH OR DEVELOPMENT

Not Applicable.

TECHNICAL FIELD

The present disclosure relates generally to wagons, and more specifically to a wagon that has a folding trailer for transporting cargo.

BACKGROUND

Wagons and trailers are well known in the art. While such wagons and trailers, according to the prior art, provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a trailer for a wagon. The trailer is preferably convertible between a use position and a folded or storage position.

The disclosed technology further relates to a trailer for a wagon, comprising: a first trailer frame pivotally connected to the wagon; a second trailer frame pivotally connected to the wagon; a first link pivotally connecting the first trailer frame to the second trailer frame; a second link pivotally connecting the first trailer frame to the second trailer frame; a first wheel rotatedly connected to one of the first link and the second trailer frame; and, a second wheel rotatedly connected to one of the second link and the second trailer frame, wherein the trailer is positionable between a first or use position and a second or folded position.

The disclosed technology further relates to a trailer for a wagon, comprising: a trailer frame comprising a first upper trailer frame pivotally connected to the wagon, a second lower trailer frame pivotally connected to the wagon, a first link pivotally connecting the first upper trailer frame to the second lower trailer frame, a first platform secured to the first upper trailer frame and an opening through the first upper trailer frame at a location adjacent the first platform, and a second platform secured to the second lower trailer frame, wherein the trailer frame is positionable in a first or use position and a second or folded position, and wherein the second platform is positioned below the opening in the first upper trailer frame when the trailer frame is in the use position; and, a first wheel rotatedly connected to the trailer frame to support the trailer frame in the use position.

The disclosed technology further relates to a trailer for a wagon, comprising: a trailer frame comprising a first frame pivotally connected to the wagon, a second frame pivotally connected to the wagon, and a first link pivotally connecting the first frame to the second frame; and, a wheel rotatedly connected to the trailer frame, wherein the trailer frame is positionable between a first or use position and a second or folded position, wherein in the use position the first frame is positioned in a first plane and the second frame is positioned in a second plane, the first plane and the second plane being spaced apart a first distance and being in different but generally parallel planes, and wherein in the folded position the first frame is positioned in a third plane and the second frame is positioned in a fourth plane, wherein the third plane and the fourth plane being spaced apart a second distance and being in different but generally parallel planes, and wherein the second distance is less than the first distance.

The disclosed technology further relates to a trailer for a wagon wherein in the use position the first trailer frame is positioned in a first plane, the second trailer frame is positioned in a second plane, and wherein the first plane and the second plane are spaced apart a first distance and are in different but generally parallel planes.

The disclosed technology further relates to a trailer for a wagon wherein in the folded position the first trailer frame is positioned in a third plane, the second trailer frame is positioned in a fourth plane, wherein the third plane and the fourth plane are spaced apart a second distance and are in different but generally parallel planes, and wherein the second distance is less than the first distance.

The disclosed technology further relates to a trailer for a wagon further comprising a first bracket connected to the wagon and the first trailer frame being pivotally connected to the first bracket at a first pivot point, and a second bracket connected to the wagon and the second trailer frame being pivotally connected to the second bracket at a second pivot point, and wherein the second pivot point is positioned further from the wagon than the first pivot point.

The disclosed technology further relates to a trailer for a wagon further comprising a stop connected to the second bracket to engage the second trailer frame and prevent the second trailer frame from continued rotation beyond the second position.

The disclosed technology further relates to a trailer for a wagon further comprising a receiver connected to the first trailer frame, the receiver engaging the second trailer frame in the folded position to retain the second trailer frame adjacent the first trailer frame in a substantially vertical position when the trailer is in the second position.

The disclosed technology further relates to a trailer for a wagon further comprising a first platform secured to the first trailer frame, an opening through the first trailer frame at a location adjacent the first platform, a second platform secured to the second trailer frame, and wherein the second platform is below the opening in the first trailer frame when the trailer is in the use position.

The disclosed technology further relates to a trailer for a wagon wherein the first wheel and the second wheel are caster wheels.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While the wagon and foldable trailer discussed herein are susceptible of embodiments in many different forms, there is shown in the drawings, and will herein be described in detail, preferred embodiments with the understanding that the present description is to be considered as an exemplification of the principles of the wagon and foldable trailer and are not intended to limit the broad aspects of the disclosure to the embodiments illustrated. Thus, the detailed description set forth below is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 8:
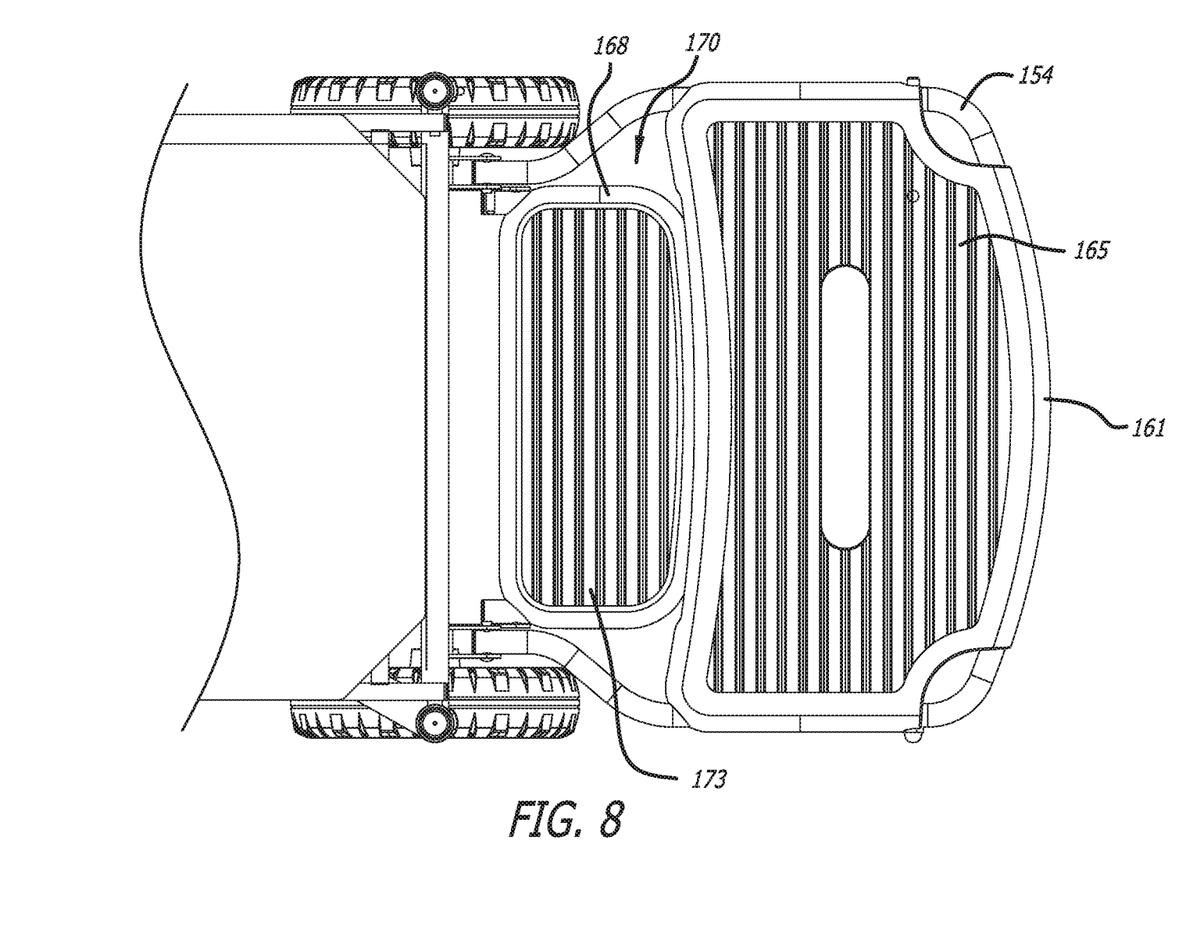
FIG. 8 is a partial top view of the wagon and trailer of FIG. 5.
Figure 9:
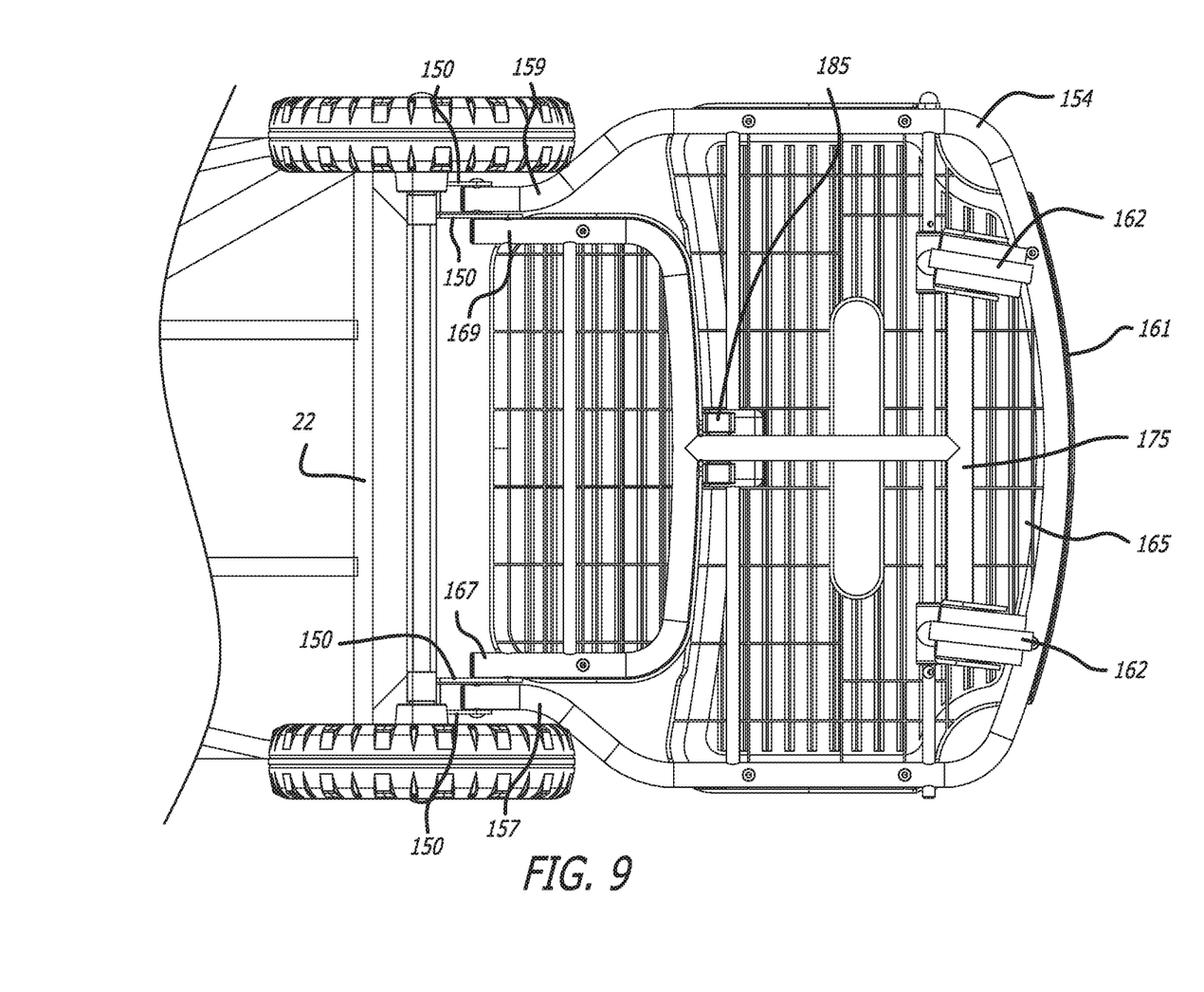
FIG. 9 is a partial bottom view of the wagon and trailer of FIG. 5.
Figure 10:
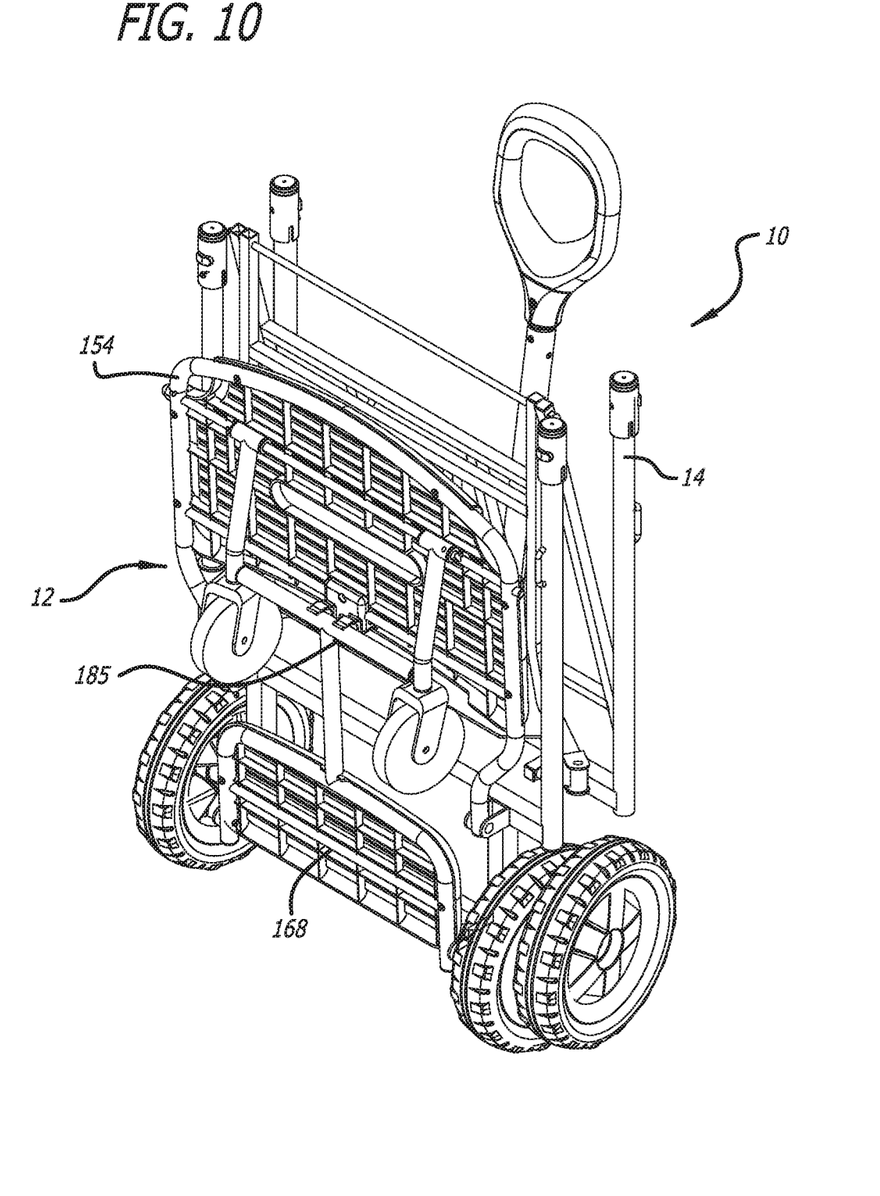
FIG. 10 is a perspective view of the wagon and trailer of FIG. 5, with the foldable wagon and the foldable trailer in the folded or storage configurations.

Referring now to the figures, and initially to FIGS. 1-10, a wagon 10 having a foldable trailer 12 is illustrated. In various embodiments the wagon 10 may be a foldable wagon 10 that includes a collapsible frame assembly 14 that is moveable between an unfolded or use configuration (FIGS. 1-9) and a collapsed or folded configuration (FIG. 10).

Figure 4:
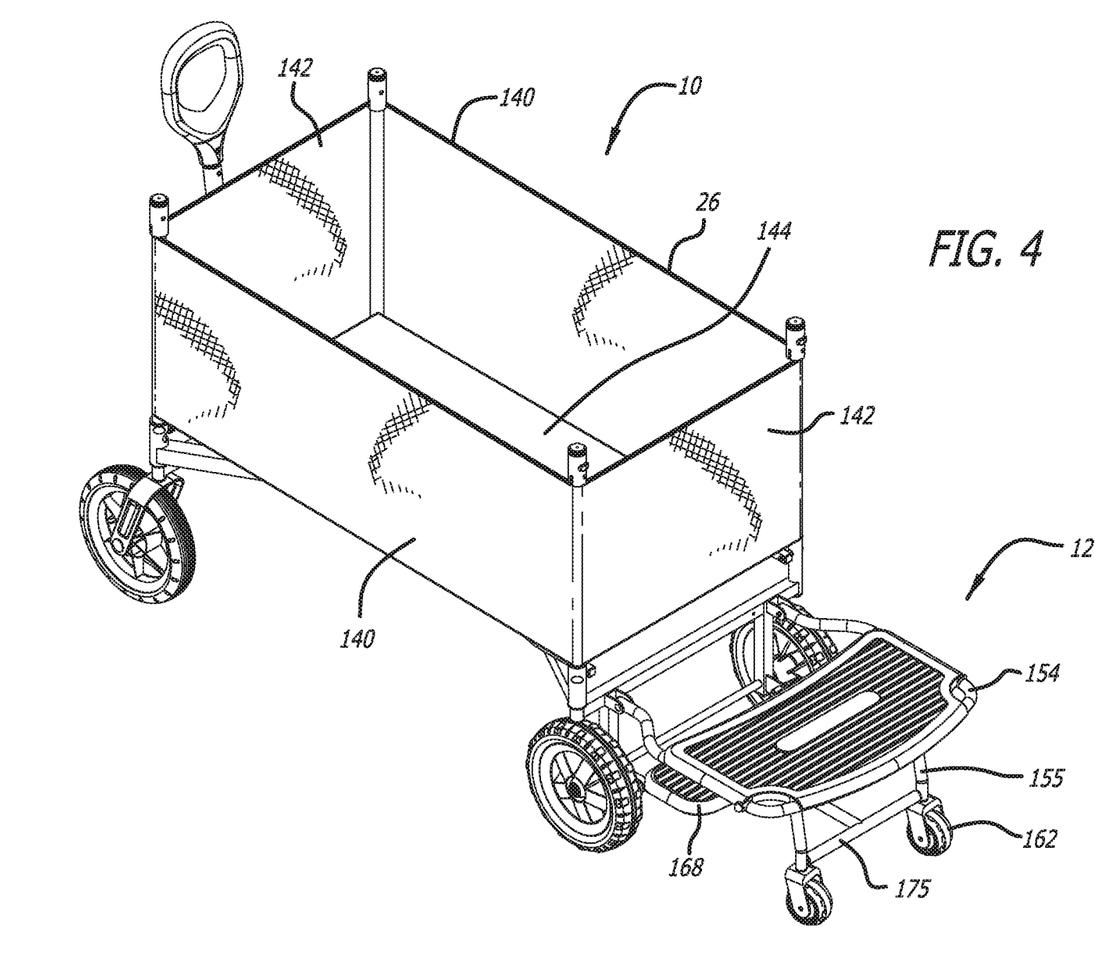
FIG. 4 is a perspective view of a wagon having a foldable trailer according to another embodiment, showing the trailer in an unfolded or use configuration and also showing a flexible housing connected to the foldable wagon frame.

In one embodiment the wagon to which the foldable trailer 12 is attached is a foldable wagon, however, the foldable trailer 12 may be used with other types of wagons, including wooden wagons, plastic wagons, and wagons that do not fold. In one embodiment of the wagon 10 where the wagon 10 is foldable, the wagon 10 has a frame assembly 14 that includes a first end assembly 16, a second end assembly 18, a first floor assembly 20 pivotally connected to and extending from the first end assembly 16, a second floor assembly 22 pivotally connected to and extending from the second end assembly 18, and a linkage assembly 24 connecting the first end assembly 16 to the second end assembly 18. Additionally, as shown in FIG. 4, in various embodiments the foldable wagon 10 includes a flexible housing 26 connected to the foldable frame assembly 14.

In various embodiments, the first end assembly 16 generally comprises two vertical members 30 and 32, connected by a front lower cross support 34 towards a bottom of the two vertical members 30 and 32. Additionally, while not required, a front upper cross support 31 may connect the two vertical members 30 and 32 toward a top of the vertical members 30, 32. In a preferred embodiment, a handle 38 is pivotally coupled to the first end assembly 16, preferably at the front lower cross member 34.

Similarly, in one embodiment the second end assembly 18 generally comprises two vertical members 40 and 42, connected by a rear lower cross support 44 towards a bottom of the two vertical members 40 and 42. A rear upper cross support 41, while not required, may connect the two vertical members 40 and 42 toward a top of the vertical members 40, 42.

In various embodiments, the foldable wagon 10 includes two front wheel assemblies 50 and a rear wheel assembly 52. The two front wheel assemblies 50 preferably comprise a wheel support 54 that is pivotally connected to the first end assembly 16 to allow the wagon 10 to turn when pulled by a user. Each front wheel assembly 50 is configured to support a front wheel 56 rotatedly mounted upon an axle assembly of the front wheel assembly 50. In one embodiment the front wheel assemblies 50 are caster assemblies for preferred steering of the wagon 10. In an alternate embodiment, not shown, the front wheel assemblies 50 are comprised of single-sided bent wire caster. Alternate turnable or non-turnable front wheels may also be utilized.

Figure 1:
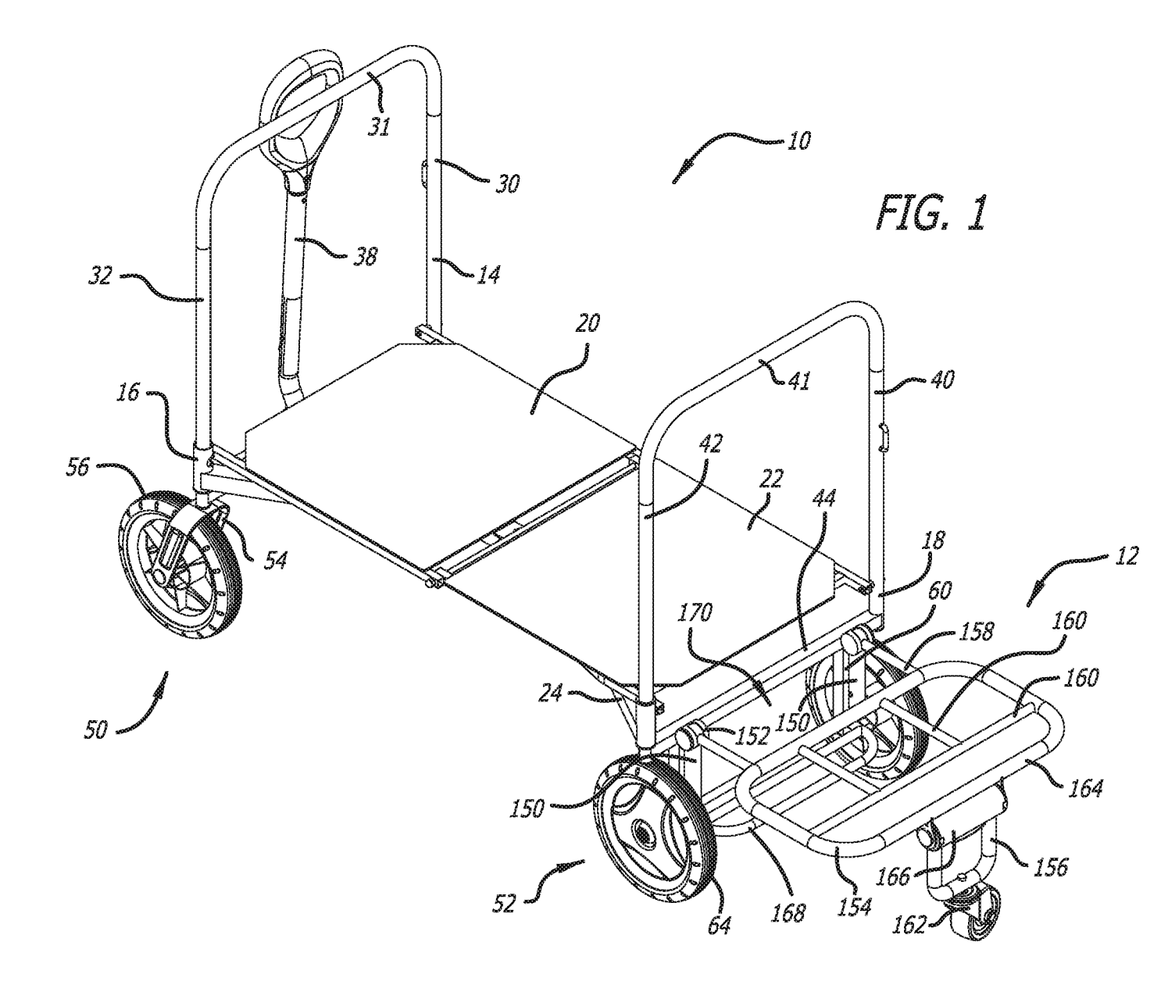
FIG. 1 is a perspective view of a wagon having a foldable trailer according to one embodiment, showing the trailer in an unfolded or use configuration.
Figure 2:
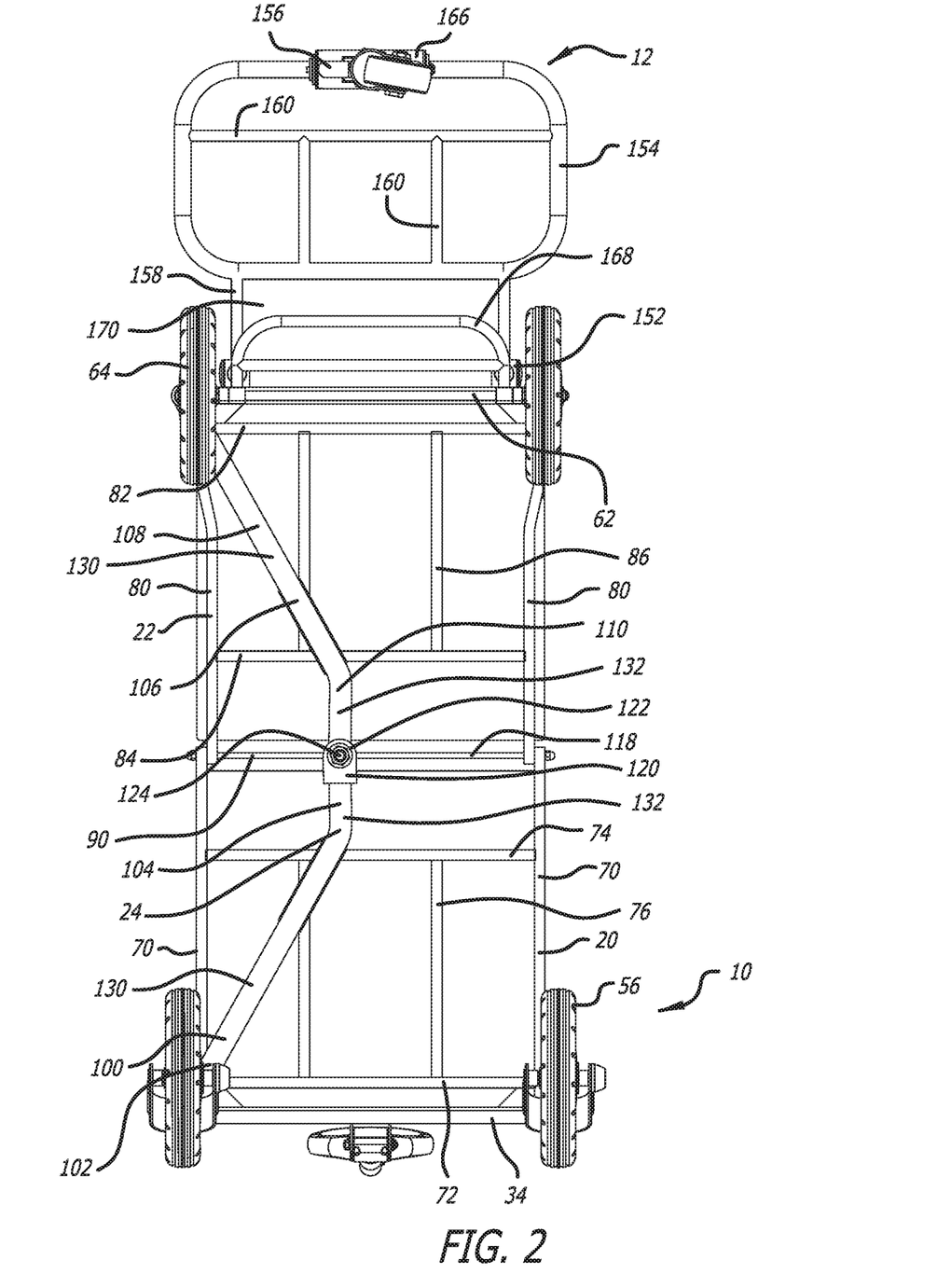
FIG. 2 is a bottom view of the wagon and trailer of FIG. 1.
Figure 5:
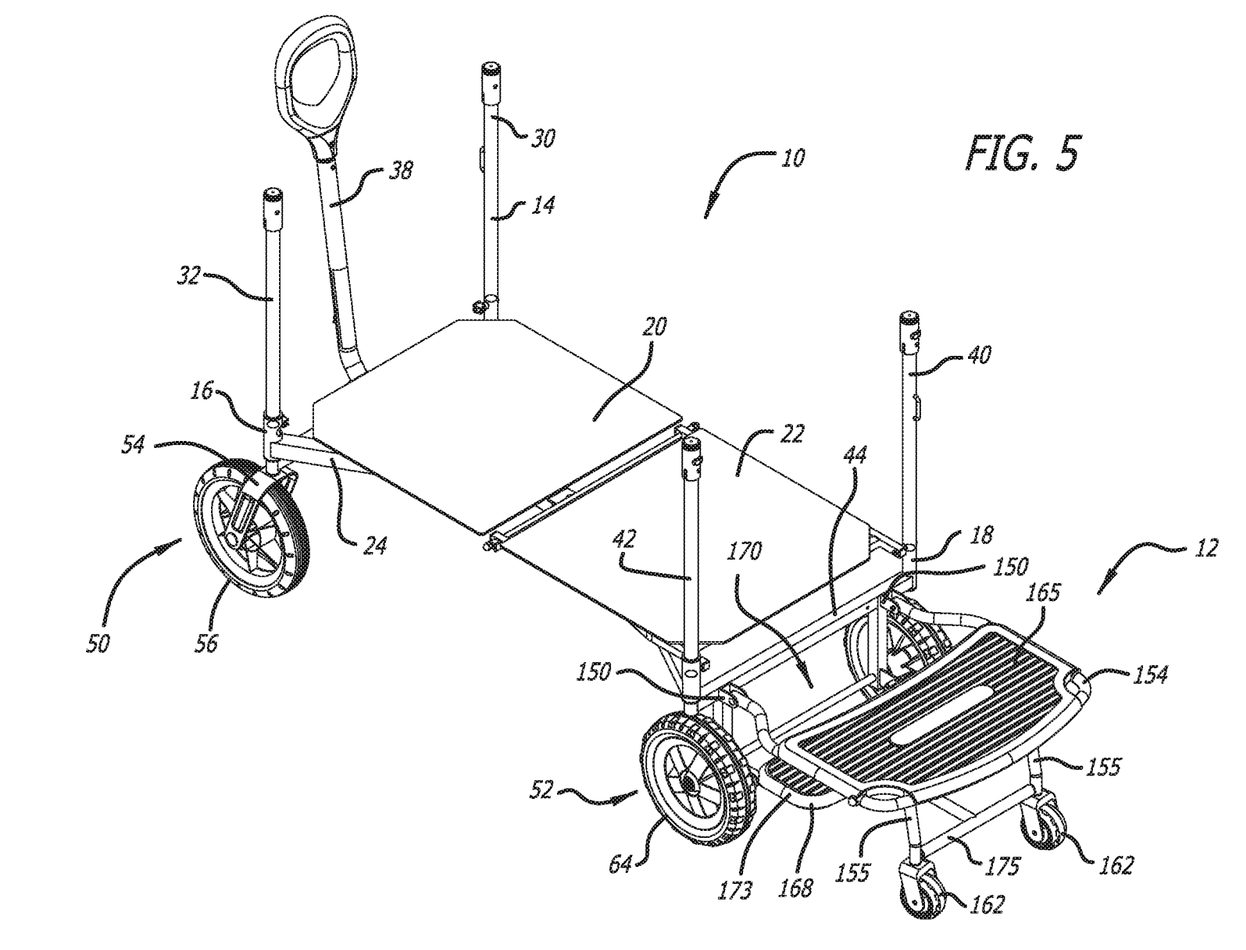
FIG. 5 is a perspective view of the wagon and trailer of FIG. 4 with the flexible housing removed from the wagon frame.

Referring to FIGS. 1 and 5, in various embodiments, the rear wheel assembly 52 is connected to the second end assembly 18. In one embodiment, a pair of downwardly extending rear wheel supports 60 extend downwardly from the rear lower cross support 44. The rear wheel supports 60 rotatedly support the rear wheel assembly 52. In one embodiment, the rear wheel assembly 52 comprises a rear axle 62 and a pair of rear wheels 64. The rear axle 62 may extend between and through the rear wheel supports 60 to rotatably support the rear wheels 64. As best shown in FIG. 2, in one embodiment, the front wheels 56 are outboard of the rear wheels 64, thereby providing greater stability for the wagon 10. Additionally, because the front wheels 56 are outboard of the rear wheels 64, the rear wheels 64 can be connected to a solid rear axle 62 and still avoid the front wheels 56 during folding of the wagon 10 as shown in FIG. 10. Alternately, however, separate rear wheel axles and holders therefor may be connected to each rear wheel support 60 to separately rotatably support the individual rear wheels 64.

Figure 3:
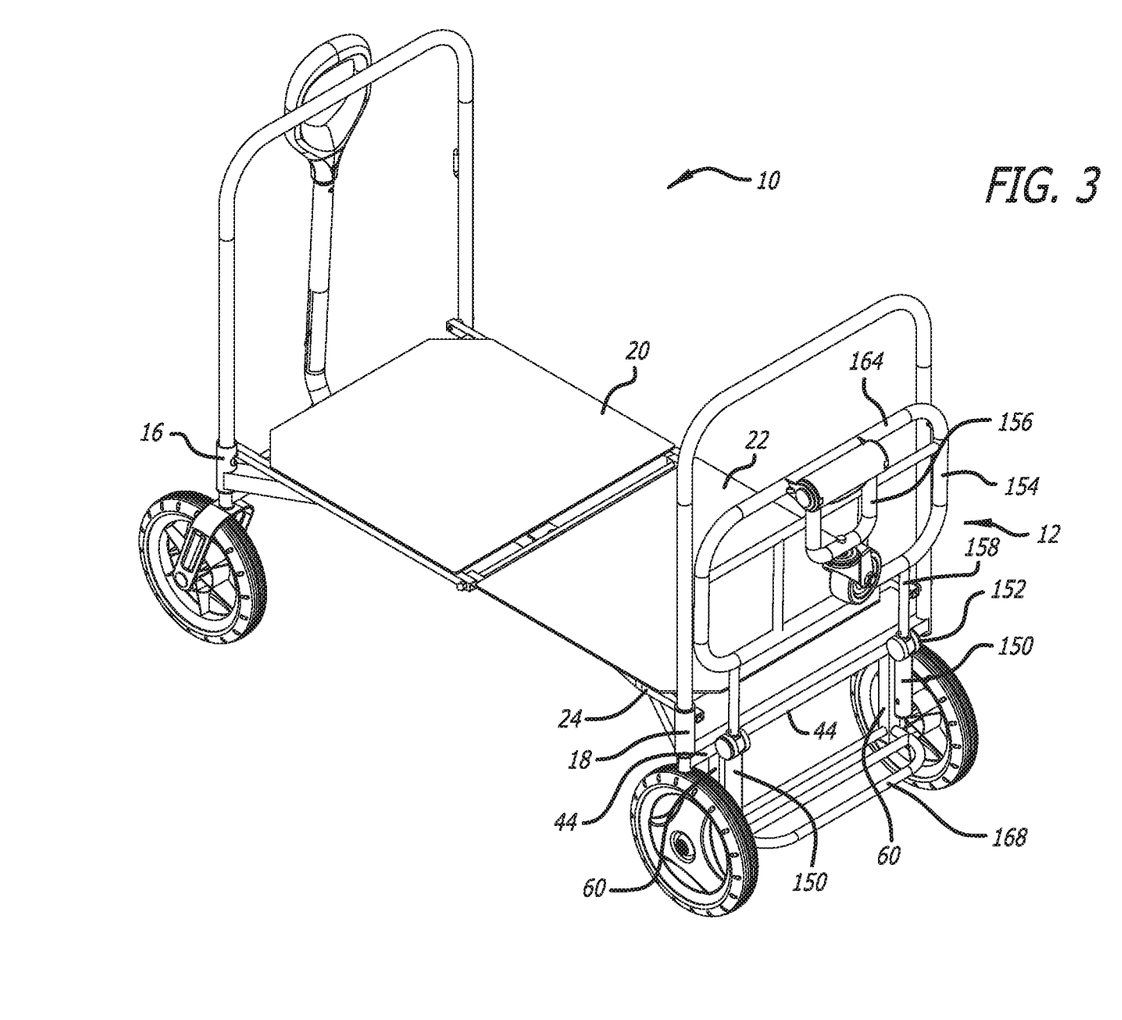
FIG. 3 is a perspective view of the wagon and trailer of FIG. 1, with the foldable trailer in the folded or storage configuration.

As shown in FIGS. 1-3, the first floor assembly 20 of the various embodiments is pivotally connected to and extends from the first end assembly 16. In one embodiment, the first floor assembly 20 generally comprises two side members 70, a first end member 72, a second end member 74, and a plurality of central support members 76. In one embodiment the first end member 72 is pivotally connected between the two vertical members 30, 32 of the first end assembly 16. Shoulder bolts or other rotatable fastening mechanisms may be used to pivotally connect the first end member 72 between and to the two vertical members 30, 32 of the first end assembly 16. The two side members 70 are preferably fixed adjacent opposing ends of the first end member 72 and extend toward a center of the floor of the wagon 10. The second end member 74 and a plurality of central support members 76 are utilized to provide rigidity to the first floor assembly 20.

Similarly, the second floor assembly 22 of the various embodiments is pivotally connected to and extends from the second end assembly 18. The second floor assembly 22 generally comprises two side members 80, a first end member 82, a second end member 84, and a plurality of central support members 86. In one embodiment the first end member 82 is pivotally connected between the two vertical members 40, 42 of the second end assembly 18. Shoulder bolts or other rotatable fastening mechanisms may be used to pivotally connect the first end member 82 between and to the two vertical members 40, 42 of the second end assembly 18. The two side members 80 are preferably fixed adjacent opposing ends of the second end member 82 and extend toward a center of the floor of the wagon 10. The second end member 84 and a plurality of central support members 86 are utilized to provide rigidity to the second floor assembly 22. In one embodiment, floor panels 87 may be secured to a top of the floor assemblies 20, 22 to provide a base or floor for the wagon 10, on which the flexible housing 26 may rest.

In one embodiment, the first and second floor assemblies 20, 22 are connected at a center brace 90. Preferably, the center brace 90 is pivotally connected to the first floor assembly 20 and the second floor assembly 22 to allow the first floor assembly 20 to be pivotally connected to the second floor assembly 22. In one embodiment, the center brace 90 is an elongated member, such as a round or other shaped tube or solid member, that extends to pivotally connect each of the side members 70 and 80 of the first and second floor assemblies 20, 22 thereto. Additionally, in a preferred embodiment, a portion of the width of the first floor assembly 20 is greater than the width of the second floor assembly 22 to allow for the side members 80 of the second floor assembly 22 to be interior but adjacent the side members 70 of the first floor assembly 20 for clearance purposes. The first and second floor assemblies 20, 22 define the floor of the wagon 10.

As best shown in FIG. 2, the linkage assembly 24 connects the first end assembly 16 to the second end assembly 18, and provides rigidity to the wagon in both the open and closed configurations, but also allows the wagon 10 to be collapsed or folded such that the first end assembly 16 and second end assembly 18 are adjacent one another (see FIG. 10). In one embodiment the linkage assembly 24 comprises a first end linkage 100 and a second end linkage 106. The first end linkage 100 has a first end 102 and a second end 104. The first end 102 of the first end linkage 100 is pivotally connected to the first end assembly 16. The second end linkage 106 has a first end 108 and a second end 110. The first end 108 of the second end linkage 106 is pivotally connected to the second end assembly 18.

Further, in one embodiment the second end 104 of the first end linkage 100 is pivotally connected to the second end 110 of the second end linkage 106. In one embodiment the pivot connection between the first end linkage 100 and the second end linkage 106 is that of a clevis and tang orientation. For example, one of second end 104 of the first end linkage 100 or the second end 110 of the second end linkage 106 has a clevis 120, and the other of the second end 104 of the first end linkage 100 or the second end 110 of the second end linkage 106 has a tang 122 that fits within the clevis 120. A pin 124 joins the clevis 120 and tang 122, and allows the first end linkage 100 and the second end linkage 106 to pivot with respect to one another during opening and closing of the wagon 10. The first end linkage 100 and the second end linkage 106 form a two-bar linkage to assist in keeping the first end assembly 16 secured to the second end assembly 18 in both the open configuration and the collapsed configuration, as well as in the transition between the open and collapsed configuration. Further, in a preferred embodiment, the first end linkage 100 and the second end linkage 106 each have a first section 130 that extends at an angle to the first and second end assemblies 16, 18, and a second section 132 that extends generally parallel to the longitudinal axis of the wagon 10. The second sections 132 meet at the pivot connection between the first and second end linkages 100, 106. In a preferred embodiment, the linkage assembly is positioned below the floor assembly in both the open configuration and the folded configuration.

In one embodiment, the wagon 10 also includes a housing assembly 26 that defines sidewalls and preferably a bottom or floor of the wagon 10. In a preferred embodiment, the housing assembly 26 is made of fabric and is referred to as the flexible housing 26. As shown in FIG. 4, the flexible housing 26 preferably includes side portions 140, end portions 142 and a bottom wall 144 or floor 144.

It is also understood that the wagon 10 may be operated without a housing assembly 26. In this orientation, the wagon frame 14 would provide structure for hauling virtually any item the user desired.

Figure 7:
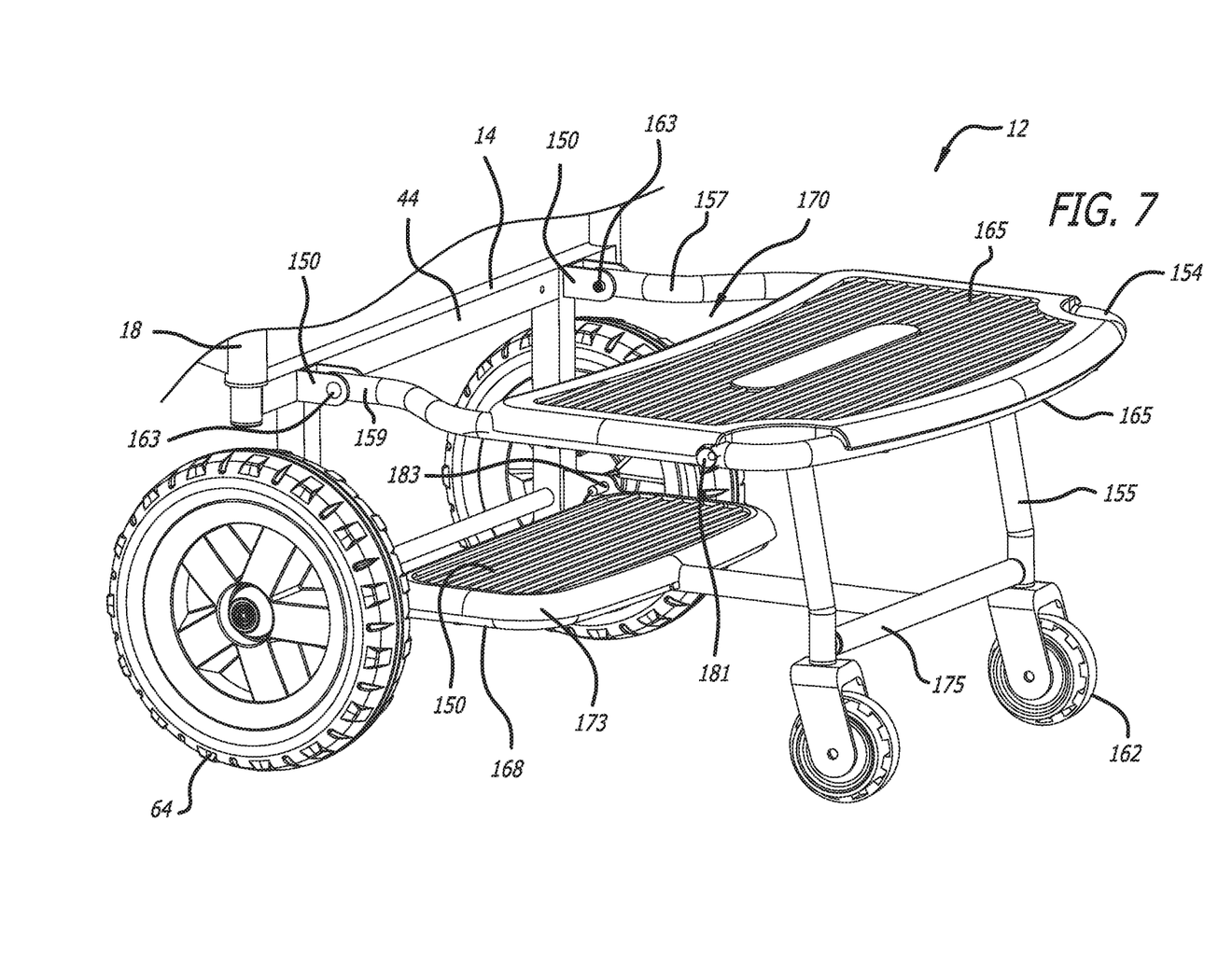
FIG. 7 is a partial perspective view of the wagon and trailer of FIG. 5.

Referring to FIG. 1, in one embodiment, the trailer assembly 12 generally comprises a first or upper frame 154 and a second or lower frame or shelf 168. In an alternate embodiment the trailer assembly 12 also has a rear support 156. In yet a further embodiment, such as shown in FIGS. 5 and 7, the trailer assembly 12 has a first frame 154, a second frame 168, a link 155 connecting the first frame 154 and the second frame 168, and a wheel 162. A mounting member 150 and a pivot member 152 may be utilized to secure the trailer assembly 12 to the wagon frame 14.

In one embodiment, the mounting member 150 may be fixedly or removably secured to the wagon frame 14. In one embodiment the mounting member 150 is secured to the downwardly extending rear wheel support 60 that extends downwardly from the rear lower cross support 44. Referring to the embodiment of FIG. 1, the trailer assembly 12 has two mounting members 150, each of which is fixedly secured to separate rear wheel supports 60 of the frame assembly 14 of the wagon 10. Further, in a most preferred embodiment, the two mounting members 150 are secured, such as by welding or some other mechanical connection (e.g., bolts) to the two rear wheel supports 60. In one embodiment the mounting members 150 are formed of tubular metal stock.

In one embodiment, the pivot members 152 connect the mounting members 150 to the first frame 154, and allow the first frame 154 to be pivotally attached to the mounting members 150 so that the frame 154 can be positioned in a use position (as shown in FIG. 1) and a storage position (as shown in FIG. 3), as well as any position therebetween. In one embodiment the first frame 154 has extensions 158 that connect the first frame 154 to the pivot members 152. The first frame 154 preferably also has cross members 160 to function as a support or platform for articles placed on the frame 154.

As shown in FIGS. 1-3, the trailer assembly 12 may also have a rear support 156. The rear support 156 helps to support the first frame 154 is the use position. In one embodiment the rear support 156 may have a wheel 162, such as a caster wheel 162, associated therewith to allow the trailer assembly 12 to be supported in the use position during movement of the wagon 10. Additionally, like the trailer assembly 12 in general, which has a use and a storage position, in a preferred embodiment the rear support 156 similarly is pivotally attached to the first frame 154, and the rear support 156 has a use position and a storage position. In the storage position of the rear support 156, shown in FIG. 3, the rear support 156 is preferably parallel with the first frame 154. In the use position, shown in FIG. 1, the rear support 156 is pivoted to be generally perpendicular with the first frame 154, such that the first frame 154, when in the use position, is preferably horizontal and parallel with the ground, and the rear support 156 is preferably contacting the ground but supporting the first frame 154. And, the caster wheel 162 at the end of the rear support 156 allows the trailer assembly 12 to be supported at the distal end 164 of the first frame 154 when the first frame 154 is in the use position and when the wagon 10 is being moved. The rear support 156 preferably has a release member 166 that allows the rear support 156 to be pivotally transitioned from the use position to the storage position, and similarly from the storage position to the use position. The rear support 156 is preferably locked in place in each of the use position and the storage position. The release member 166 unlocks the rear support 156 and allows it to be pivotally moved.

As shown in FIGS. 1-3, in one embodiment the wagon 10 may also include a second frame 168, such as a shelf 168. In the embodiment shown in the figures, the second frame 168 is connected to the wagon 10, and in this example the second frame 168 is connected to the downwardly extending rear wheel support 60 that extends downwardly from the rear lower cross support 44. Alternately, however, the second frame 168 may attach to the mounting members 150 of the trailer assembly 12. The second frame 168 generally comprises an extension extending from the wagon 10 on which additional articles can be supported. The second frame 168 may be pivotable, like the first frame 154, or it may be fixed to the mounting members 150 or wagon frame 14.

Referring to FIG. 3, in the storage position of the trailer assembly 12 the rear support 156 is preferably in the storage position such that it is generally in a plane parallel to the first frame 154. Further, in the storage position of the trailer assembly 12 the first frame 154 is also in the storage position such that it extends vertically from the mounting members 150. In this embodiment, to use the trailer assembly 12 the rear support 156 is preferably placed into the use position by engaging the release member 166 to unlock the rear support 156 and transitioning the rear support 156 to a be perpendicular to the first frame 154. Next, the first frame 154 is transitioned to the use position by pivoting the first frame 154 toward the ground. In the use position of the first frame 154 the rear support 156 will engage the ground to support the rear portion of the first frame 154. The trailer assembly 12 may be used to support heavier articles, such as coolers or other larger articles. The second frame 168 is provided to support longer articles, such as, for example, folding bag chairs or other longer articles in the vertical orientation that extend through an opening or cavity 170 in the first frame 154. For example, bag chairs can be inserted into the cavity 170 created by the wagon 10, the extensions 158, and the first frame 154, and rest on the second frame 168.

In an alternate embodiment, not shown, the mounting member 150 is a tubular member with an open cavity, and the extensions 158 are inserted and slid into the cavity of the mounting member 150 in the storage position. To place the first frame 154 into the use position the first frame 154 is lifted up and out of the mounting members 150. The extensions 158 may have pins toward an end of the extensions that slid in a slot in the mounting member 150 in the vertical orientation, but they pivot at the top of the slot to allow the first frame 154 to pivotally transition from the vertical storage orientation to the horizontal use orientation.

Another alternate embodiment of the trailer assembly 14 is shown in FIGS. 4-10. In this embodiment, as best shown in FIGS. 5 and 7, the trailer assembly 14 generally comprises a first frame 154, a second frame 168, a pair of links 155 connecting the first frame 154 and the second frame 168, and a pair of wheels 162. A mounting member or bracket 150 is connected to the wagon frame 12, and the first and second frames 154, 168 are pivotally connected to the mounting brackets 150 to pivotally secure the trailer assembly 12 to the wagon frame 14.

Figure 6:
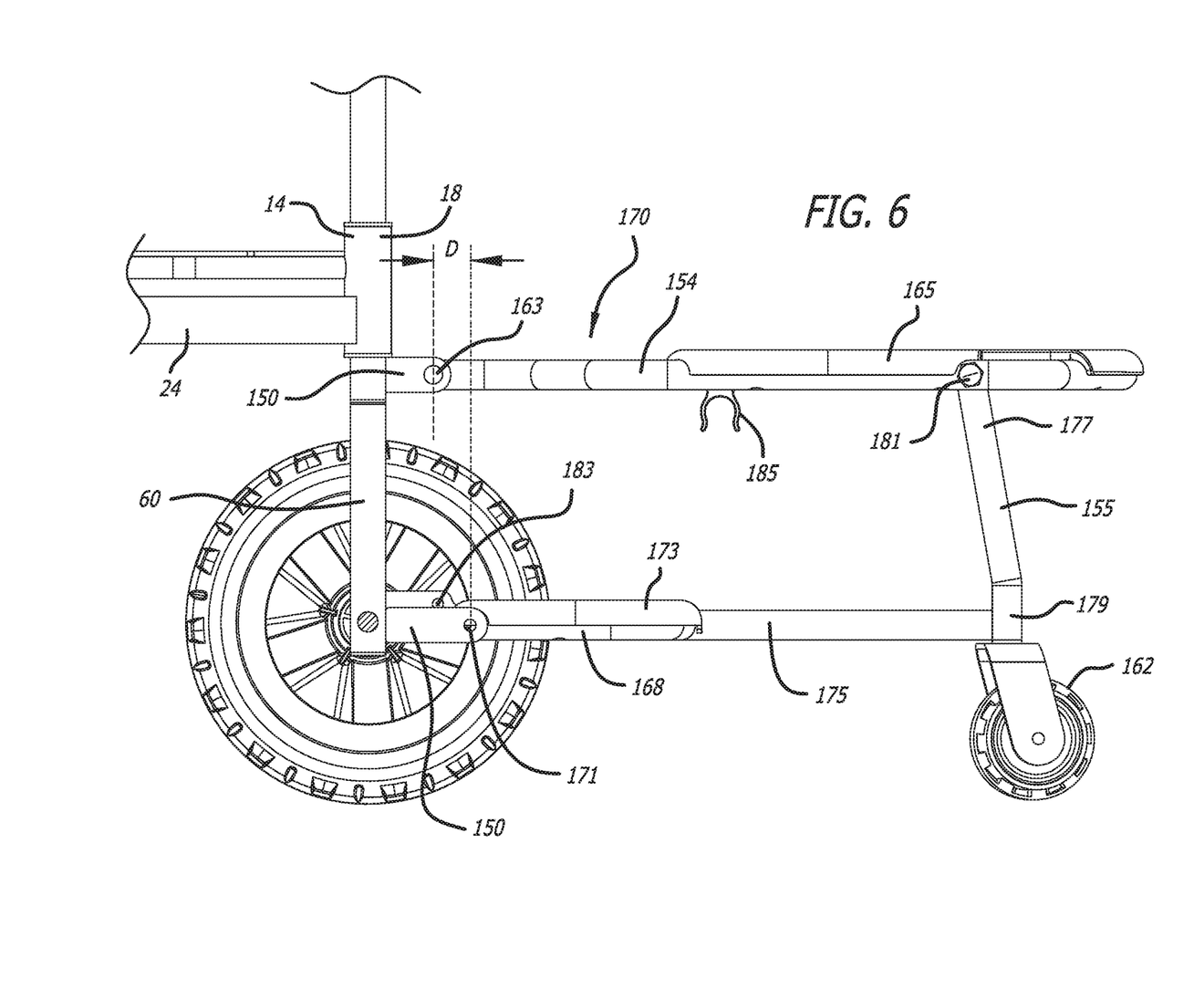
FIG. 6 is a partial side view of the wagon and trailer of FIG. 5, with one of the rear wheels of the wagon removed.

The first frame 154 in this embodiment preferably comprises a U-shaped exterior tubular frame member having a first end 157, a second end 159 and a distal end 161. The distal end 161 of the first frame 154 is the portion of the frame 154 that is furthest away from the wagon 10 in the use mode of the trailer assembly 12. The first end 157 of the first frame 154 is pivotally secured to the first bracket 150, and the opposing second end 159 of the first frame 154 is pivotally secured to the second bracket 150. The first end 157 and the second end 159 are secured to the respective first and second brackets 150 at respective first pivot points 163 as shown in FIG. 6. The first pivot points 163 are where the first frame 154 is pivotally secured to the brackets 150, and also represent a distance from the wagon 10. The brackets 150 may be u-shaped brackets 150 and pins or bolts may be used to pivotally secure the first frame 154 to the brackets 150. The first frame 154 also has a first platform 165 secured thereto. The first platform 165 is preferably a generally flat surface to support items place on the first frame 154. Finally, the first frame 154 has an opening 170 extending through the first frame 154 at a location adjacent the platform 165.

In a preferred version of the second embodiment, the trailer assembly 14 also has a second frame 168 pivotally connected to the wagon. The second frame 168 similarly preferably comprises a U-shaped exterior tubular frame member having a first end 167 and a second end 169. The first end 167 of the second frame 168 is pivotally secured to the second bracket 150 at a second pivot point 171 as shown in FIGS. 6 and 9. The second pivot points 171 are where the second frame 168 is pivotally secured to the brackets 150, and also represent a distance from the wagon 10. In a preferred embodiment the second pivot point 171 is positioned further from the wagon than the first pivot point 163 by a distance D. Referring to FIGS. 7, 9 and 10, in one embodiment the second frame 168 has a second platform 173 secured thereto. The second platform 173 is likewise preferably a generally flat surface to support items place on the second frame 168. In one embodiment, the second frame 168 has an extension 175 extending distal the U-shaped portion of the second frame 168.

As best shown in FIG. 7, in one embodiment, as explained above, a link 155 is provided to pivotally connect the first trailer frame 154 to the second trailer frame 168. Further, in a preferred embodiment, two links 155 are provided, a first link 155 and a second link 155. In one embodiment, a first end 177 of the links 155 is pivotally connected to the first trailer frame 154 and a second end 179 of the links 155 is pivotally connected to the second trailer frame 168. As best shown in FIGS. 6 and 7, a shaft 181 is provided in the first trailer frame 154 and the first end 177 of the links 155 are pivotally secured to the shaft 181. And, the second end 179 of the links 155 is pivotally secured to the extension 175 of the second frame 168 as shown in FIG. 7. The link 155 connects the first and second trailer frames 154, 168 so that the first and second trailer frames 154, 168 pivot together with respect to the wagon 10 between the use and storage positions.

The trailer assembly 12 preferably also has a wheel 162, such as a caster wheel 162, rotatedly connected to one of the link 155 or the second trailer frame 168 to support the trailer frame in the use position. In a preferred version of this embodiment, the trailer assembly 12 has a first wheel 162 rotatedly connected to one of the first link 155 or the second trailer frame 168, and a second wheel 162 rotatedly connected to one of the second link 155 or the second trailer frame 168.

The trailer assembly 12 is positionable between a first or use position, as shown in FIGS. 4-8, and a second or folded position as shown in FIG. 10. In the use position the first trailer frame 154 is positioned in a first plane and the second trailer frame 168 is positioned in a second plane as best shown in FIG. 6. As shown in FIG. 6, preferably the first plane and the second plane are spaced apart a first distance and are in different but generally parallel planes. A stop 183 is provided, preferably in one of the brackets 150, such as one of the brackets 150 connected to the second frame 168 as shown in FIG. 7, to operate as a stop to prevent over-rotation of the trailer assembly 12 when moving from the storage position to the use position. Additionally, as shown in FIGS. 6 and 8, in the use position the second platform 173 is preferably positioned below the opening 170 in the first trailer frame 154 when the trailer is in the use position. In such an orientation various items, such as chairs, etc., can be inserted through the opening 170 in the first frame 154 and rest on the second platform 173 of the second frame 168 to be held vertically by the second platform 173 and axially by the first frame 154.

To transition the trailer assembly 12 from the use position to the storage position the user typically pivots the distal end 161 of the first frame 154 upwardly and toward the wagon 10. The first frame 154 and second frame 168 will pivot together because of the connection via the links 155. As shown in FIGS. 6 and 9, a receiver 185 is connected to the bottom of the first trailer frame 154 to engage and retain the second trailer frame 168 in a substantially vertical orientation in the folded position. The receiver 185 may be a c-clamp or other style receiver. As shown in FIG. 9, the receiver 185 preferably engages the extension 175 extending distal the U-shaped portion of the second frame 168. In the folded position the first trailer frame 154 is positioned in a third plane and the second trailer frame 168 is positioned in a fourth plane. As shown in FIG. 10, the third plane and the fourth plane are spaced apart a second distance and are in different but generally parallel planes. Further, in a preferred embodiment, the second distance between the third plane and the fourth plane is less than the first distance between the first plane and the second plane.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A trailer for a wagon, comprising:
    a first trailer frame pivotally connected to the wagon;
    a first platform secured to the first trailer frame, an opening through the first trailer frame at a location adjacent the first platform;
    a second trailer frame pivotally connected to the wagon;
    a second platform secured to the second trailer frame, and wherein the second platform is below the opening in the first trailer frame when the trailer is in the use position;
    a first link pivotally connecting the first trailer frame to the second trailer frame;
    a second link pivotally connecting the first trailer frame to the second trailer frame;
    a first wheel rotatedly connected to one of the first link and the second trailer frame; and,
    a second wheel rotatedly connected to one of the second link and the second trailer frame, wherein the trailer is positionable between a first or use position and a second or folded position.

2. The trailer of claim 1, wherein in the use position the first trailer frame is positioned in a first plane, the second trailer frame is positioned in a second plane, and wherein the first plane and the second plane are spaced apart a first distance and are in different but generally parallel planes.

3. The trailer of claim 2, wherein in the folded position the first trailer frame is positioned in a third plane, the second trailer frame is positioned in a fourth plane, wherein the third plane and the fourth plane are spaced apart a second distance and are in different but generally parallel planes, and wherein the second distance is less than the first distance.

4. The trailer of claim 1, further comprising a first bracket connected to the wagon and the first trailer frame being pivotally connected to the first bracket at a first pivot point, and a second bracket connected to the wagon and the second trailer frame being pivotally connected to the second bracket at a second pivot point, and wherein the second pivot point is positioned further from the wagon than the first pivot point.

5. The trailer of claim 4, further comprising a stop connected to the second bracket to engage the second trailer frame and prevent the second trailer frame from continued rotation beyond the second position.

6. The trailer of claim 1, further comprising a receiver connected to the first trailer frame, the receiver engaging the second trailer frame in the folded position to retain the second trailer frame adjacent the first trailer frame in a substantially vertical position.

7. The trailer of claim 1, further comprising a first platform secured to the first trailer frame, an opening through the first trailer frame at a location adjacent the first platform, a second platform secured to the second trailer frame, and wherein the second platform is below the opening in the first trailer frame when the trailer is in the use position.

8. The trailer of claim 1, wherein the first wheel and the second wheel are caster wheels.

9. A trailer for a wagon, comprising:
a trailer frame comprising a first upper trailer frame pivotally connected to the wagon, a second lower trailer frame pivotally connected to the wagon, a first link pivotally connecting the first upper trailer frame to the second lower trailer frame, a first platform secured to the first upper trailer frame and an opening through the first upper trailer frame at a location adjacent the first platform, and a second platform secured to the second lower trailer frame, wherein the trailer frame is positionable in a first or use position and a second or folded position, and wherein the second platform is positioned below the opening in the first upper trailer frame when the trailer frame is in the use position; and,
a first wheel rotately connected to the trailer frame to support the trailer frame in the use position.

10. The trailer of claim 9, wherein in the use position, the first upper trailer frame is positioned in a first plane, the second lower trailer frame is positioned in a second plane, and wherein the first plane and the second plane are spaced apart a first distance and are in different but generally parallel planes.

11. The trailer of claim 10, wherein in the folded position, the first upper trailer frame is positioned in a third plane, the second lower trailer frame is positioned in a fourth plane, wherein the third plane and the fourth plane are spaced apart a second distance and are in different but generally parallel planes, and wherein the second distance is less than the first distance.

12. The trailer of claim 9, further comprising a receiver connected to the first upper trailer frame, the receiver engaging the second lower trailer frame in the folded position to retain the second lower trailer frame adjacent the first upper trailer frame in a substantially vertical position when the trailer is in the second position.

13. The trailer of claim 9, further comprising a first bracket connected to the wagon and the first upper trailer frame being pivotally connected to the first bracket at a first pivot point, and a second bracket connected to the wagon and the second lower trailer frame being pivotally connected to the second bracket at a second pivot point, and wherein the second pivot point is positioned further from the wagon than the first pivot point.

14. The trailer of claim 13, further comprising a stop connected to the second bracket to engage the second lower trailer frame and prevent the second lower trailer frame from continued rotation beyond the second position.

15. A trailer for a wagon, comprising:
a trailer frame comprising a first frame pivotally connected to the wagon, the first frame having an upper and lower surface, a second frame pivotally connected to the wagon, the second frame having an upper and lower surface, and a first link pivotally connecting the first frame to the second frame; and,
a wheel rotately connected to the trailer frame, wherein the trailer frame is positionable between a first or use position and a second or folded position, wherein in the use position the first frame is positioned in a first plane and the second frame is positioned in a second plane, and the lower surface of the first frame is adjacent the upper surface of the second frame, the first plane and the second plane being spaced apart a first distance and being in different but generally parallel planes, and wherein in the folded position the first frame is positioned in a third plane and the second frame is positioned in a fourth plane, and the lower surface of the first frame is adjacent the upper surface of the second frame, wherein the third plane and the fourth plane being spaced apart a second distance and being in different but generally parallel planes, and wherein the second distance is less than the first distance.

16. The trailer of claim 15, further comprising a receiver connected to the first frame, the receiver engaging the second frame in the folded position to retain the second frame adjacent the first frame in a substantially vertical position.

17. The trailer of claim 16, further comprising a first bracket connected to the wagon and the first frame being pivotally connected to the first bracket at a first pivot point, and a second bracket connected to the wagon and the second frame being pivotally connected to the second bracket at a second pivot point, and wherein the second pivot point is positioned further from the wagon than the first pivot point.

18. The trailer of claim 17, further comprising a stop connected to the second bracket to engage the second frame and prevent the second frame from continued rotation beyond the second position.

19. The trailer of claim 15, further comprising a first platform secured to the first trailer frame, an opening through the first trailer frame at a location adjacent the first platform, a second platform secured to the second trailer frame, and wherein the second platform is below the opening in the first trailer frame when the trailer is in the use position.

20. The trailer of claim 15, wherein the wheel is a caster wheel.

21. A trailer for a wagon, comprising:
a trailer frame comprising a first frame directly pivotally connected to the wagon, a second frame directly pivotally connected to the wagon, and a first link pivotally connecting the first frame to the second frame; and,
a first wheel rotately connected to the trailer frame wherein the trailer frame is positionable between a first or use position and a second or folded position, wherein in the use position the first frame is positioned in a first plane and the second frame is positioned in a second plane, the first plane and the second plane are spaced apart a first distance and are in different but generally parallel planes, and wherein in the folded position the first frame is positioned in a third plane and the second frame is positioned in a fourth plane, wherein the third plane and the fourth plane are spaced apart a second distance and are in different but generally parallel planes, and wherein the second distance is less than the first distance.

\* \* \* \* \*